United States Patent
Poole et al.

(10) Patent No.: US 9,378,549 B2
(45) Date of Patent: Jun. 28, 2016

(54) ESTIMATION OF CONFIDENCE LIMITS FOR MEASUREMENTS DERIVED FROM IMAGE DATA

(71) Applicants: KABUSHIKI KAISHA TOSHIBA, Tokyo (JP); Toshiba Medical Systems Corporation, Otawara-shi (JP)

(72) Inventors: Ian Poole, Edinburgh (GB); Jillian Steel, Edinburgh (GB)

(73) Assignees: KABUSHIKI KAISHA TOSHIBA, Tokyo (JP); TOSHIBA MEDICAL SYSTEMS CORPORATION, Otawara-shi (JP)

(*) Notice: Subject to any disclaimer, the term of this patent is extended or adjusted under 35 U.S.C. 154(b) by 366 days.

(21) Appl. No.: 13/785,264

(22) Filed: Mar. 5, 2013

(65) Prior Publication Data
US 2014/0254903 A1    Sep. 11, 2014

(51) Int. Cl.
G06K 9/00 (2006.01)
G06T 7/00 (2006.01)

(52) U.S. Cl.
CPC ............. *G06T 7/0014* (2013.01); *G06T 7/0012* (2013.01); *G06T 2207/30056* (2013.01)

(58) Field of Classification Search
USPC .................................................. 382/128, 131
See application file for complete search history.

(56) References Cited

U.S. PATENT DOCUMENTS

| 6,571,005 B1* | 5/2003 | Li et al. ..................... 382/133 |
| 7,840,039 B2* | 11/2010 | Fuchs ..................... A61B 5/04 382/128 |
| 8,265,355 B2 | 9/2012 | Zhao et al. |
| 8,965,070 B2* | 2/2015 | Bredno ................. G06F 19/345 382/128 |
| 2004/0172401 A1* | 9/2004 | Peace ........................... 707/100 |
| 2005/0249391 A1* | 11/2005 | Kimmel et al. ............... 382/128 |
| 2006/0072817 A1* | 4/2006 | Lee et al. ..................... 382/173 |
| 2007/0165915 A1* | 7/2007 | Fuchs ........................... 382/128 |
| 2008/0260226 A1 | 10/2008 | Moriya |
| 2009/0088620 A1* | 4/2009 | Zagorchev ........... A61B 6/5247 600/407 |
| 2009/0324083 A1* | 12/2009 | Campbell et al. ............. 382/190 |
| 2011/0160546 A1* | 6/2011 | Madsen ........................ 600/300 |
| 2013/0243291 A1* | 9/2013 | Varsha et al. ................. 382/131 |

FOREIGN PATENT DOCUMENTS

| CN | 101861125 A | 10/2010 |
| JP | 4849449 | 1/2012 |

OTHER PUBLICATIONS

Combined Chinese Office Action and Search Report issued Sep. 2, 2015 in Patent Application No. 201410078530.8 (with English Translation of Category of Cited Documents).

* cited by examiner

*Primary Examiner* — John Strege
(74) *Attorney, Agent, or Firm* — Oblon, McClelland, Maier & Neustadt, L.L.P

(57) ABSTRACT

A medical image processing apparatus comprises an image data processing unit configured to determine a result by processing image data using an algorithm, a confidence interval (CI) evaluation unit configured to determine a confidence interval for the result from at least two initial results, and an output unit configured to provide the confidence interval to a user.

21 Claims, 6 Drawing Sheets

ESTIMATION OF CONFIDENCE LIMITS FOR MEASUREMENTS DERIVED FROM IMAGE DATA

FIELD

Embodiments described herein relate generally to a method of, and apparatus for, determining a confidence interval for results obtained from medical image data.

BACKGROUND

A wide variety of medical imaging techniques, for example CT, MRI, ultrasound, PET or X-ray imaging are used to provide images of the human body or other subject. Often a feature of interest found in a set of images is subject to measurement making use of automatic or semi-automatic algorithms performed at by medical imaging software. Clinically useful measurements are presented as a result or results to the user. Examples of results include measurement of size, such as the diameter of a vessel, the volume of lesions, organs, tumors or other features, or other calculated quantities such as a percentage stenotic volume. The result may be determined using an algorithm making use of a predetermined parameter or set of parameters. In a simple example, a threshold value for intensity may be used by an algorithm to determine the boundary of a particular feature.

The results may be used to aid in clinical decision making about treatment such as surgery. Results may be desired to allow assessment of change occurring over time, for example if a tumor volume is increasing or decreasing.

Assessment of the reliability of a calculated result can be difficult as the result is typically presented to the user as a number, without calculation of the appropriate number of significant figures for the result or any indication of the possible errors in the measurement.

Assessment of the usefulness of a particular result is complicated not only by the errors inherent in the imaging system and the measurement technique applied but also by variations occurring from one image acquisition to another and further by the uncertainty inherent in biological definition of a feature being observed in a real subject.

Manual adjustment of the measuring technique, and/or subjective assessment of the degree of certainty associated with a result based on operator experience, may be employed. However these approaches may not reliably reveal possible issues arising associated with the accuracy or precision of a particular result.

By way of example, FIG. 1a shows a line-drawing representing a scan of a liver containing a lesion. FIG. 1b shows the original scan. The lesion (indicated by arrow) appears clear and with well defined boundaries on the images and one would therefore expect that a measurement of its size (e.g. volume) could be calculated with some confidence as to its accuracy. In contrast, the line-drawn image 1c and the corresponding original image 1d show a papillary endolymphatic sac tumour (indicated by arrow) as a less distinct feature. Measurement of the size of the tumour is less certain as the boundary of the tumour appears less distinct.

BRIEF DESCRIPTION OF THE DRAWINGS

Embodiments are now described, by way of non-limiting example, and are illustrated in the following figures, in which.

DETAILED DESCRIPTION

According to an embodiment there is provided a medical image processing apparatus, comprising an image data processing unit configured to determine a result by processing medical image data using an algorithm, a confidence interval (CI) evaluation unit configured to determine a confidence interval for the result from at least two initial results, and an output unit configured to provide the confidence interval to a user.

According to an embodiment there is provided a method of medical imaging that comprises determining a result from image data by processing medical image data using an algorithm. The method further comprises determining a confidence interval for the result from at least two initial results and providing the confidence interval to a user.

Figure 1A:
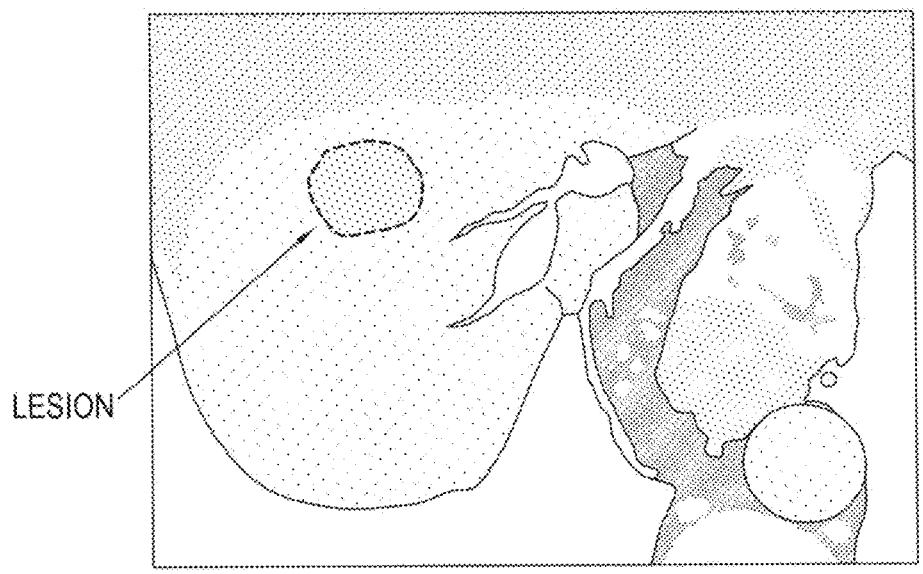
FIGS. 1a and 1b are line-drawn images and corresponding original scan image of a liver containing a lesion.
Figure 1B:
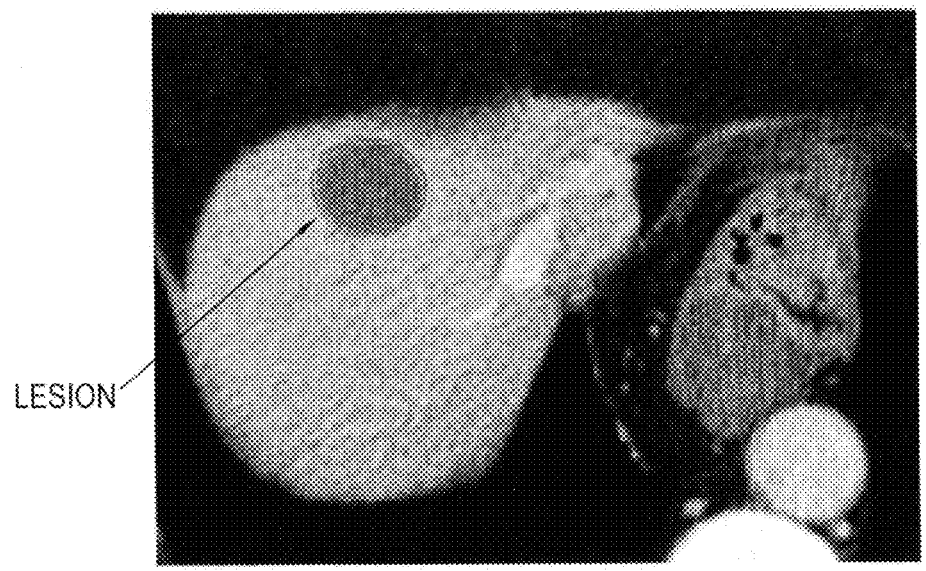
Figure 1C:
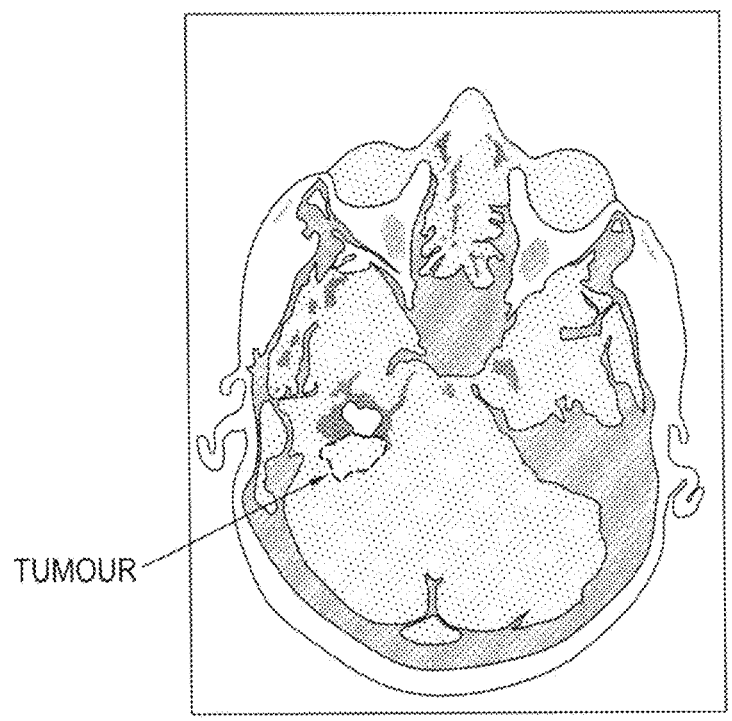
FIGS. 1c and 1d are line-drawn images and corresponding original scan images of a papillary endolymphatic sac tumour.
Figure 1D:
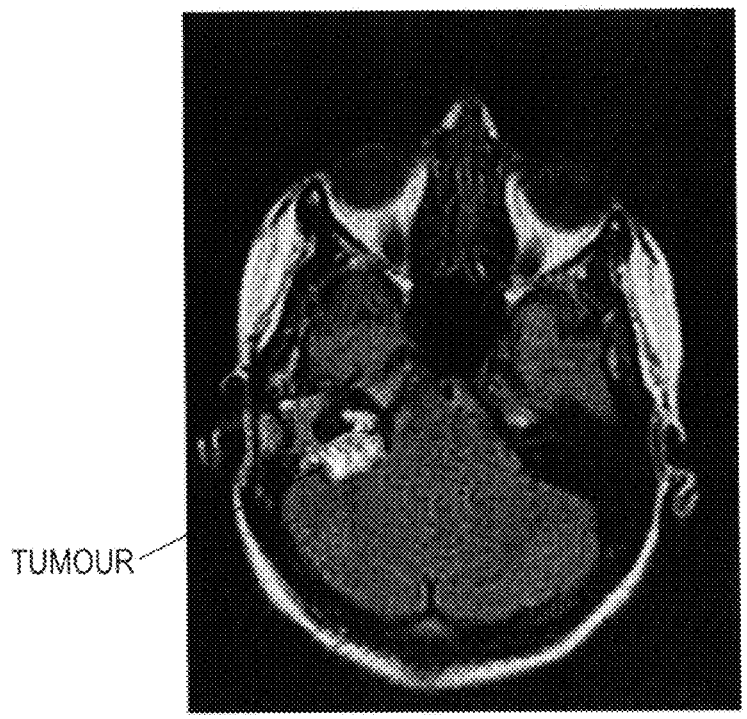
Figure 2:
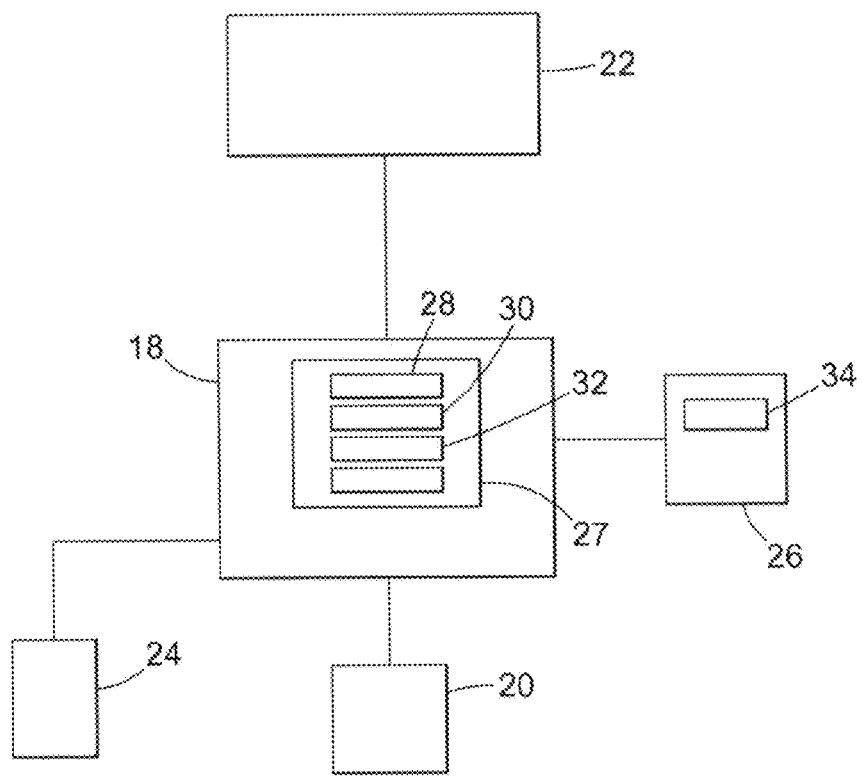
FIG. 2 is a schematic diagram of a medical image processing apparatus according to an embodiment.

A medical image processing apparatus according to an embodiment is illustrated schematically in FIG. 2 and is configured to implement the method described in the preceding paragraph. The apparatus comprises a processing apparatus 18, in this case a personal computer (PC) or workstation that is connected to a display device 20, a CT scanner 22 and a user input device or devices 24, in this case a computer keyboard and mouse. The apparatus also includes a data store 26.

Any suitable type of CT scanner may be used, for example one of the Aquilion™ series of scanners produced by Toshiba Medical Systems Corporation. Although the embodiment of FIG. 2 is described in relation to CT scan data, any other suitable type of scanner producing any suitable type of image data may be used in alternative embodiments, for example ultrasound data, MRI data, PET data, or X-ray data.

The processing apparatus 18 provides a processing resource for automatically or semi-automatically processing image data, and comprises a central processing unit (CPU) 27 that is operable to load and execute a variety of units that are configured to perform a method as described in detail below with reference to FIGS. 3 and 5.

The units include an image data processing unit 28 configured to determine a result from image data, a confidence interval (CI) evaluation unit 30 configured to determine a confidence interval for the result and an output unit 32 configured to provide the confidence interval to a user, for example by outputting the determined confidence interval to the display device 20.

The processing apparatus 18 also includes a hard drive and other components of a PC including RAM, ROM, a data bus, an operating system including various device drivers, and hardware devices including a graphics card. Such components are not shown in FIG. 2 for clarity. Any suitable processing apparatus may be used in alternative embodiments.

In the embodiment of FIG. 2 a series of image data sets 34 is received by the processing apparatus 18 from a remote data store (not shown) or from the CT scanner 22, and are stored in the data store 26 and processed by the processing apparatus. Although the scanner 22 shown in the embodiment of FIG. 2 is a CT scanner, any other suitable type of scanner can be used to obtain the image data sets in alternative embodiments.

Figure 3:
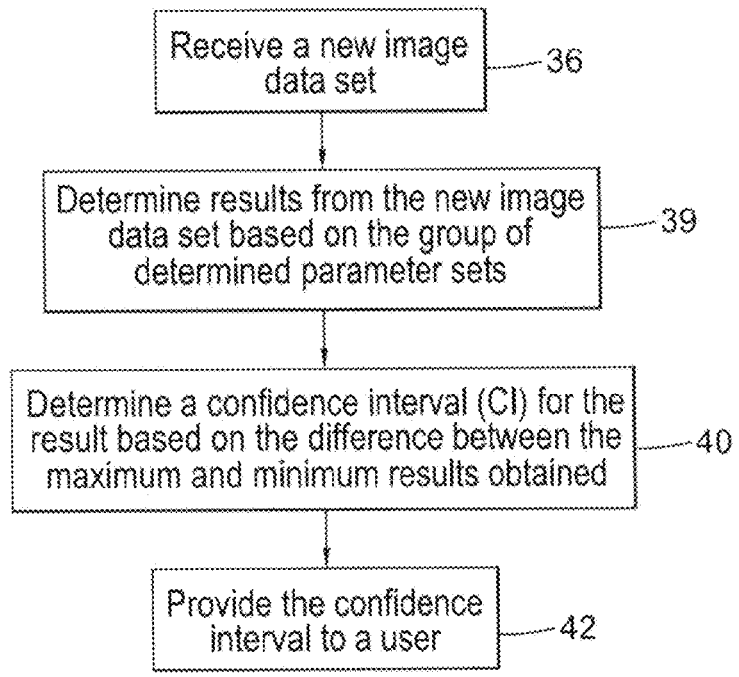
FIG. 3 is a flow chart illustrating in overview a mode of operation of the embodiment of FIG. 2.

The system of FIG. 2 is configured to perform a process having a sequence of stages as illustrated in overview in the flow chart of FIG. 3.

At the first stage 36, the processing apparatus 18 receives a new image data set 34 from the scanner 22, via the image data store 26. Various known image processing techniques are used to process the image data set, for example to produce an image. For instance, the image data may be processed either automatically or in accordance with a user selection to present one or more particular 3D or 2D representations. For example, a particular 3D projection, such as multi-planar reformat (MPR), may be used to generate an image and the image may also be subject to various user operations (such as pan, crop or zoom). Various automatic or semi-automatic detection procedures may also be used in order to identify anatomical regions or features of interest.

Figure 4A:
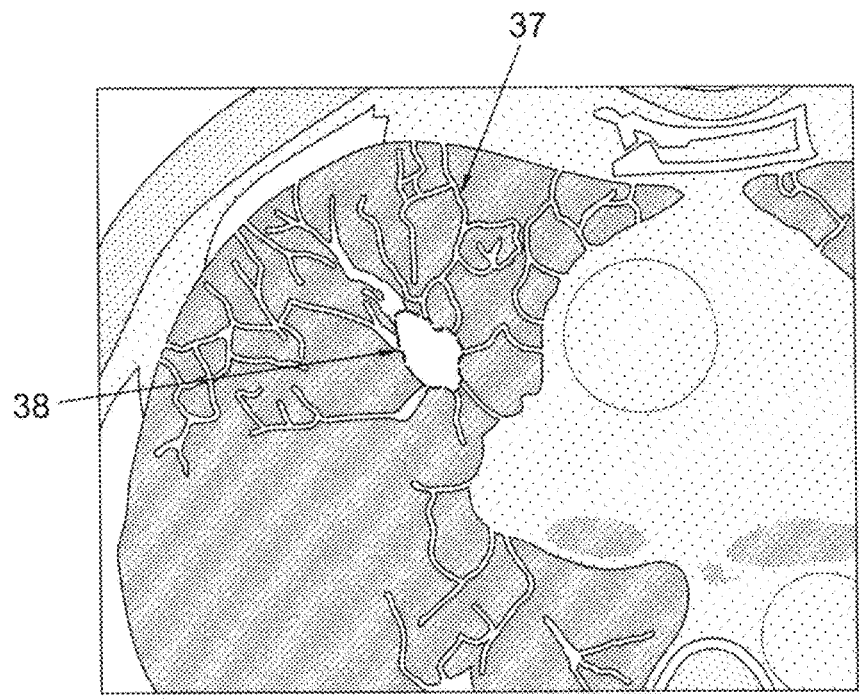
FIGS. 4a and 4b are line-drawn images and corresponding original scan images of a lung including a lesion.
Figure 4B:
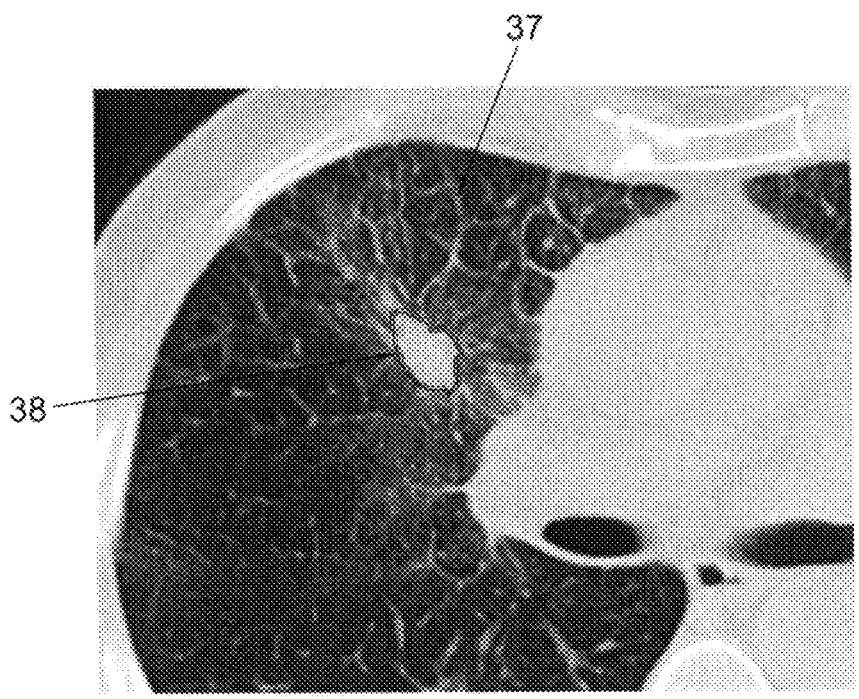

In the present example, the image data is processed in order to obtain a section through the data representing a lung nodule. See FIGS. 4a and 4b which show in line drawing and in original scan respectively a lung 37 and associated nodule 38. In other examples, the image data can represent any other region of a patient or other subject.

At the second stage 39 the image data processing unit 28 calculates a volume for the nodule by processing the image data set using an algorithm that uses an optimal threshold intensity value or other parameter or parameters for determining the boundaries of the nodule. Alternatively the volume may be calculated using a plurality of parameter sets to provide different initial results for the volume, one from each parameter set. The result is then determined by a statistical analysis of the initial results, for example to determine result as being the mean or median of the initial results. Outliers may be excluded before performing the statistical analysis in some embodiments.

At the third stage 40 the confidence interval evaluation unit 30 determines a confidence interval for the result and provides it to the output unit 42 which can send a signal representing the confidence interval (CI) to the display device 20 for the information of a user. Usually, the CI will be supplied to the display together with the result.

The CI is determined from the variation in results obtained using different, selected parameter sets, rather than based on estimation of specific errors or sources of error arising from any particular piece of equipment or process. As such, the determined CI can be influenced by or represent errors arising from all parts of the measurement pipeline, including for example but not limited to image acquisition noise and distortion, inaccuracies and blunders in automatic segmentation, uncertainty in biological definition, without requiring identification of the particular source or size of any individual errors.

The CI may be calculated on the basis of the difference between the maximum and minimum results obtained. Alternatively the confidence interval is determined from any other difference between the results, or by any other suitable statistical analysis of the results from the plurality of parameter sets.

The CI may be supplied in the form of a percentage value, a ±absolute value or error bars on a graph. Alternatively and/or additionally the CI may be presented as boundary markings on an image or as shading or colouring on the image, with a variation or boundary in shading or colouring representing the extent of the CI.

In other embodiments, the CI may be used in the selection of results for browsing by a user or for use in an animated sequence, with for example only those results falling within the CI being selected. The user may then be able to select their preferred result from results falling within the CI.

In some embodiments, the output unit is configured to provide the result to the user with a numerical precision determined by the magnitude of the determined confidence interval.

The CI may be determined from at least two initial results, wherein a different pre-determined parameter set, which may for example be referred to as a parameter vector, is used to calculate each initial result. The different pre-determined parameter sets may be obtained by a parameter perturbation analysis performed on a ground truth set of image data. Usually the parameter perturbation analysis is performed at an earlier, development stage, and the parameter sets obtained as a result of that parameter perturbation analysis are provided to the processing apparatus 18 for use by the confidence interval (CI) evaluation unit 30 in determining CIs in subsequent image processing procedures. The parameter sets obtained as a result of the parameter perturbation analysis may be included in software, or datasets, provided to any suitable image processing apparatus for use in subsequent image processing procedures.

Figure 5:
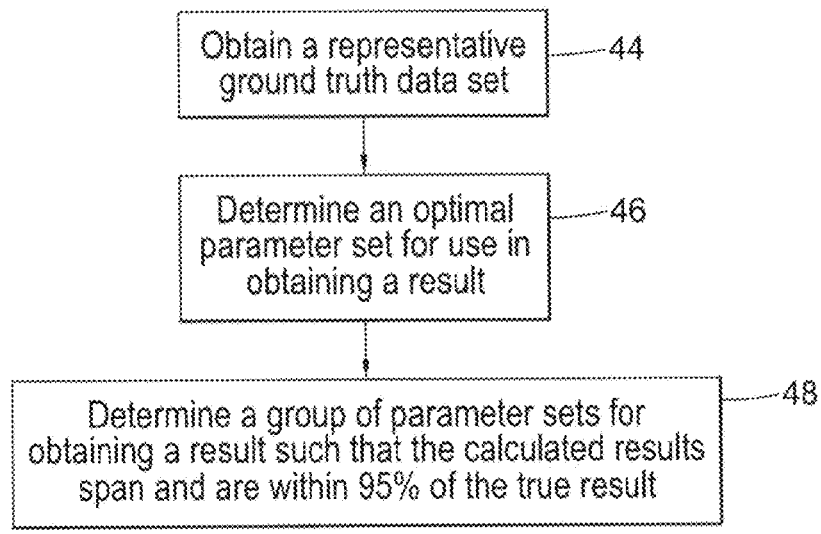
FIG. 5 is a flow chart illustrating in overview a method of determining parameter sets for use in the mode of operation of the embodiment of FIG. 2.

A method of performing a parameter perturbation analysis according to an embodiment is illustrated in overview in the flow chart of FIG. 5.

At the first stage 44 a representative ground truth data set is obtained. For the example of a nodule on a lung discussed above this may be a set of image data for a lung having a nodule whose dimensions have been determined accurately by an expert, usually from close examination of the image data. The ground truth has a value for the result that is accepted as correct.

At the second stage 46, an optimal parameter set is obtained. The optimal parameter set is the set of parameters that can be used to determine the result (nodule volume in this case) in an acceptably accurate fashion. It may be based on the ground truth or on other experience with the feature being measured. This stage is optional as the result may also be calculated for new image data by using a plurality of parameter sets to provide different initial results for the volume. The result may be determined by a statistical analysis of the initial results, such as by an averaging procedure.

The parameters can represent any suitable properties that can be used by an algorithm to determine a result of interest from medical image data, for example but not limited to threshold values, threshold values applied to intensities, threshold values applied to level-set fields, kernel sizes, kernel sizes for convolutions, kernel sizes for morphological operations, prior probabilities in classification based methods, and internal and/or external force weighting in snake based methods.

At the third stage 48 a plurality of parameter sets for obtaining the result are determined such that the initial results, calculated from each parameter set, are within 95% of a correct value. These parameter sets may span the true result. The 95% figure is an indication of the confidence level. Any other predetermined range may be used, and alternative predetermined confidence levels, such as 90% may be chosen.

As an alternative the plurality of parameter sets may be obtained by selecting parameter sets where the results produced fall within a threshold value of each true result 95% of the time.

The number of parameters in the parameter set depends on the type of result being calculated and the particular algorithm used. In some cases a result is obtained by setting a single parameter and then performing a calculation. For others a set of parameters that may vary are used in the calculation and so more than one parameter is included in the set.

The plurality of parameter sets is then used when carrying out the process of FIG. 3 on image data where a measurement is required and a confidence interval desired. At step 39 initial results are obtained making use of the plurality of parameter sets. The result itself is determined either by statistical analysis of the initial results or by using an optimal parameter set or other selected one of the parameter sets. At step 40 the confidence interval is determined for the results making use of the initial results, for example by obtaining the difference between the maximum and minimum initial results. However, other statistical analysis may be employed, for example to remove anomalous (outlying) initial results.

Any suitable number of parameter sets and initial results can be used, depending for example on processing and speed requirements In some cases it has been found that four initial results/parameter sets are sufficient to provide useful results.

In general an embodiment including a parameter perturbation analysis performed on a ground truth set of image data and calculating the result on the basis of an optimal parameter set may be described as follows.

The measurement process to obtain a result may be represented as the scalar function f(D; $\underline{p}$), where D is the image data, and $\underline{p}$ is the parameter set required for the calculation of a result. An optimal value of $\underline{p}$ is found during algorithm "tuning" against ground truth—call this $\underline{p}$*.

Where a confidence level of 95% is desired, a plurality of parameter sets is chosen such that the true result falls within the estimated range 95% of the time. That is, several (usually a small number, e.g. 4) further values for $\underline{p}$, are found. The plurality of parameter sets $\underline{q}$, represented as Q={$\underline{q}$}, are chosen such that over representative ground truth, f(D, $\underline{q}$), they span the correct value t(D) 95% of the time (or as close as possible within quantisation constraints).
Formally, define:

$$S(D)=1 \text{ if max } [\underline{q} \text{ in } Q] \ f(D;\underline{q}) > t(D) > \min \ [\underline{q} \text{ in } Q] \ f(D;\underline{q}), \text{ else } 0$$

Require, for i=1 to n, where n is the number of parameter sets:

$$\Sigma i \ S(Di)/n \approx 0.95.$$

Then, for a new image dataset D the CI is found by max [q in Q] f(D;$\underline{q}$)−min[q in Q] f(D;$\underline{q}$).
The ±absolute value is half of the CI. The best estimate of the result is reported as f(D; $\underline{p}$*).

Figure 6:
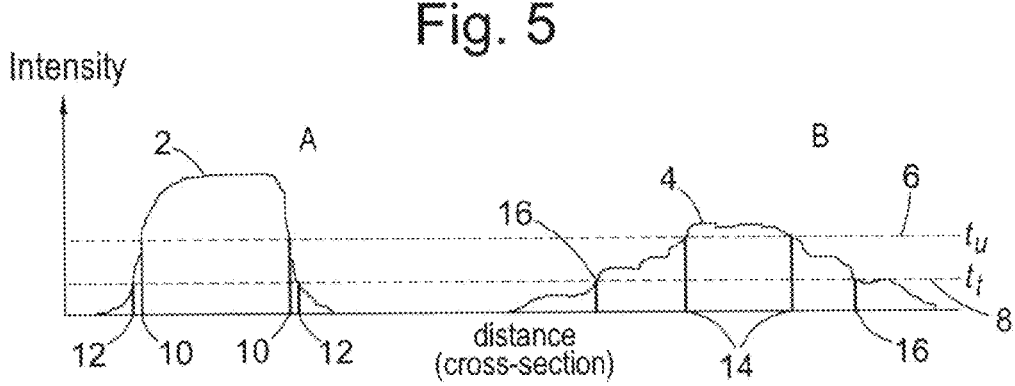
FIG. 6 shows schematically the use of image intensity data.

An application of the described embodiments can be understood with reference to a simplified example illustrated by example in FIG. 6. The example shows cross sections A and B through a volume where intensity is plotted from image data and the objective is to measure the features 2 and 4 to obtain a result such as cross section diameter. The features 2 and 4 show a higher intensity than the surrounding tissue. For the sake of this simplified example, assume the analysis is to be done by a simple intensity threshold.

The boundaries of a feature, used to calculate a result, are determined by setting a parameter, in this case the threshold intensity value. In this example two values for the parameter are shown; a higher intensity threshold value 6 ($t_u$) and a lower intensity value threshold value 8 ($t_l$). For feature 2 using either intensity value results in boundaries, indicated by vertical lines 10 or 12 that are close to each other. Therefore using either parameter (6 or 8) a similar result for the diameter or volume will be obtained. The confidence interval (CI) for the result will be narrow.

In contrast for feature 4 changing the parameter from value 6 to value 8 causes a large change in the boundaries as indicated by vertical lines 14 and 16. This shows that calculating a diameter or volume of feature 4 can only be done with reduced confidence; the confidence interval for the result will be higher. This phenomenon may be because the feature 4 does in reality have less well defined boundaries than feature 2 or because the image data for feature 4 is not of as high quality as that for feature 2.

The example described in relation to FIG. 6 represents a simple case in which each parameter set comprises a single parameter value, in this case a threshold value. In alternative embodiments, the parameters of the parameter set can represent any of a wide range of different quantities, depending on the nature of the medical image data, the algorithm that is being used and the result that is being sought. Any suitable parameter sets and algorithms can be used.

In the example of FIG. 6, the result being sought is the volume of a feature. In alternative embodiments, the method may be used in connection with the processing of medical image data to obtain any suitable result for example, but not limited to, a length, a diameter, an area, a volume, a stenotic index, intensity at a point, average intensity across a region, an angle.

By providing a confidence interval (CI) that is determined for each result, the user can be provided with a more objective view of the accuracy of the calculated result.

The confidence interval may be determined from at least two initial results, wherein different pre-determined parameter sets are used to calculate each initial result. In this example an intensity threshold value constitutes a parameter set.

Calculating initial results from different parameter sets can be used to determine a confidence interval. Where the calculation is more complex, more than one parameter may be used in the calculation of a result and so a parameter set will define each of the parameters required for calculation of an initial result.

The confidence interval may be determined from the difference between the maximum and minimum of the at least two initial results. The difference between the maximum and minimum of the initial results may simply be halved to give a ±absolute value or the difference may be expressed as a percentage value of the result or in any other suitable fashion.

Figure 7:
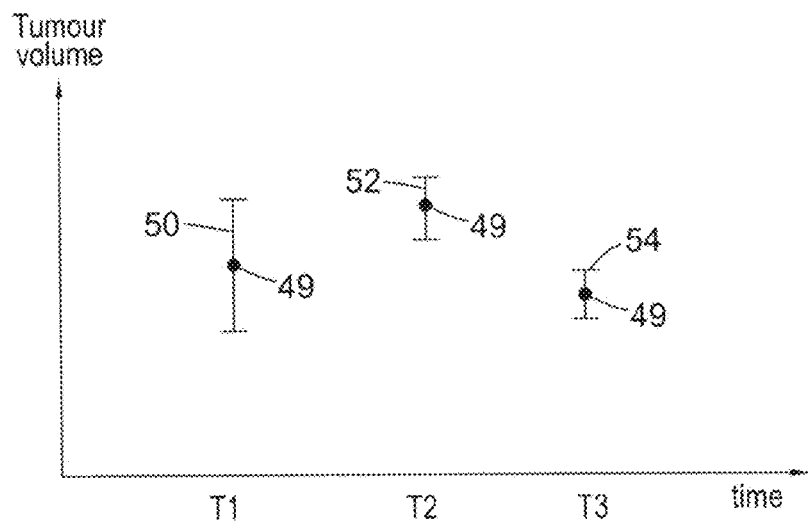
FIG. 7 is a graph showing confidence intervals shown as error bars.

The provision of a confidence level can be used in a number of ways. In FIG. 7 a graph is shown indicating for illustrative purposes the supposed progression in the volume of a tumour over time. The confidence interval for each result 49 is shown as an error bar. Note that as each confidence interval is based on the image data associated with each result, the error bars vary in size for each measurement. The errors bars 50, 52 for the tumour volume result at time points T1 and T2 overlap in range. This suggests that the apparent increase in tumour volume at T2 is not statistically significant. In contrast, the error bars 50, 54 for tumour volume at time points T2 and T3 do not overlap, indicating that the apparent decrease in tumour volume at T3 is statistically significant.

Figure 8A:
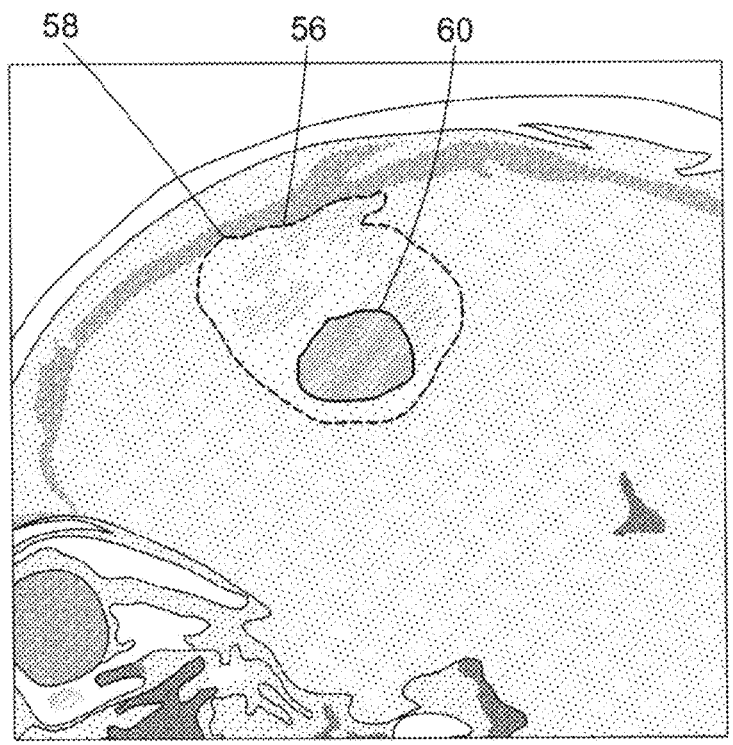
FIGS. 8a and 8b are line-drawn images and corresponding original scan images an image with a feature highlighted with boundary markings.
Figure 8B:
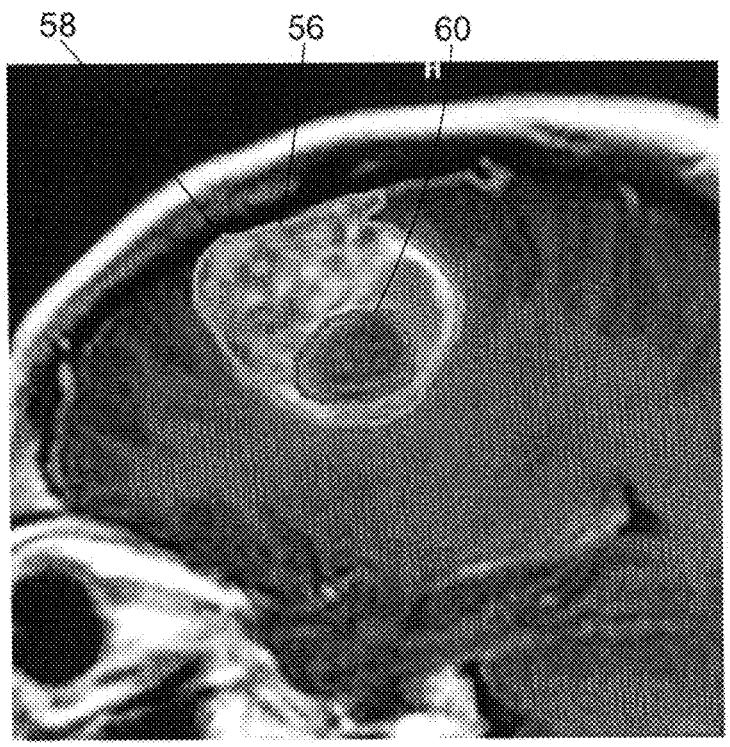

FIG. 8a shows a line-drawing representing a scan containing a feature of interest 56, in this case a meningioma, and the corresponding FIG. 8b shows the original scan. In this example the confidence interval calculation has been used to provide outer 58 and inner 60 boundary markings to the feature. The outer boundary marking 58 may be derived as the union of the results obtained using a plurality of predetermined parameter sets found using the method of the flow chart in FIG. 4. The inner boundary marking 60 may be derived as the intersection of the results from a plurality of predetermined parameter sets found using the method of the flow chart in FIG. 4. Alternatively such boundaries may be placed on an image based on maximum and minimum values for the result as determined from the confidence interval.

Embodiments can implement certain functionality by means of a computer program having computer-readable instructions that are executable to perform the method of the embodiments. The computer program functionality could be implemented in hardware (for example by means of CPU), software or a mixture of hardware and software. The embodiments may also be implemented by one or more ASICs (application specific integrated circuit), FPGAs (field programmable gate arrays) graphic processing units (GPUs) or any other suitable processing device.

Whilst particular units have been described herein, in alternative embodiments, functionality of one or more of those units can be provided by a single unit, processing resource or other component, or functionality provided by a single unit can be provided by two or more units or other components in combination. Reference to a single unit encompasses multiple components providing the functionality of that unit, whether or not such components are remote from one another, and reference to multiple units encompasses a single component providing the functionality of those units.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. A medical image processing apparatus, comprising:
   processing circuitry configured to
      determine a result by processing medical image data using an algorithm; and
      determine a confidence interval for the result from at least two initial results, wherein each of the initial results is obtained by separate analysis of the medical image data using the algorithm with a respective different parameter set; and
   a display configured to provide the confidence interval to a user.

2. The apparatus according to claim 1, wherein each parameter set is a parameter set of the algorithm, and the processing circuitry obtains each of the initial results by processing the medical image data using the algorithm.

3. The apparatus according to claim 1, wherein the processing circuitry determines the confidence interval from at least one difference between the initial results.

4. The apparatus according to claim 3, wherein the processing circuitry determines the confidence interval to be a difference between a maximum and minimum of the at least two initial results.

5. The apparatus according to claim 1, wherein the processing circuitry determines the result by the processing circuitry by a statistical analysis of the at least two initial results.

6. The apparatus according to claim 5, wherein the processing circuitry determines the result to be at least one of a mean or median of the at least two initial results.

7. The apparatus according to claim 1, wherein the processing circuitry determines the result using a selected one of the parameter sets.

8. A medical image processing apparatus, comprising:
   processing circuitry configured to
      determine a result by processing medical image data using an algorithm; and
      determine a confidence interval for the result from at least two initial results; and
   a display configured to provide the confidence interval to a user,
   wherein each of the initial results is determined using a respective, different parameter set;
   the parameter sets are obtained by analysis performed on a ground truth set of image data; and
   the parameter sets are selected to provide a predetermined confidence level against the ground truth set of image data.

9. The apparatus according to claim 1, wherein the display is configured to represent the confidence interval on a medical image provided to the user.

10. The apparatus according to claim 9, wherein the display is configured to mark, on a feature of the image, maximal and minimal boundaries representative of the confidence interval.

11. The apparatus according to claim 10, wherein the maximal and minimal boundaries represent respectively a union and intersection of the initial results.

12. The apparatus according to claim 1, wherein the display provides the confidence interval to a user in the form of at least one of: a percentage value, a ±absolute value, and error bars on a graph.

13. The apparatus according to claim 1, wherein each parameter set comprises a value of at least one parameter.

14. The apparatus according to claim 1, wherein each parameter set comprises at least one parameter representing at least one of threshold values, threshold values applied to intensities, threshold values applied to level-set fields, kernel sizes, kernel sizes for convolutions, kernel sizes for morphological operations, prior probabilities in classification based methods, and internal and/or external force weighting in snake based methods.

15. The apparatus according to claim 1, wherein the processing circuitry determines the result, which comprises at least one of a length, a diameter, an area, a volume, a stenotic index, intensity at a point, average intensity across a region, and an angle.

16. The apparatus according to claim 1, wherein the display is configured to provide the result to the user with a numerical precision determined by a magnitude of the determined confidence interval.

17. The apparatus according to claim 1, wherein the medical image data comprises one of ultrasound, CT data, MRI data, PET data, and X-ray data.

18. A method of medical imaging, comprising:
   determining a result by processing medical image data using an algorithm;
   determining a confidence interval for the result from at least two initial results, wherein each of the initial results is obtained by separate analysis of the medical image data using the algorithm with a respective different parameter set; and
   providing the confidence interval to a user.

19. A non-transitory computer-readable memory storing a computer program comprising computer-readable instructions that are executable by a processor to perform the method according to claim 18.

20. The apparatus according to claim 8, wherein the processing circuitry selects parameter sets to provide a predetermined confidence level against the ground truth set of image data of at least one of a) and b):
   a) at least 90%;
   b) at least 95%.

21. A medical image processing apparatus, comprising:
   processing circuitry configured to
      determine a result by processing medical image data using an algorithm; and
      determine a confidence interval for the result from at least two initial results; and
   a display configured to provide the confidence interval to a user,
   wherein each of the initial results is determined using a respective, different parameter set; and
   the parameter sets are selected to provide results that are within a predetermined range of a correct value when the parameter sets are used to process a ground truth set of image data.

* * * * *